United States Patent Office 3,614,847
Patented Oct. 26, 1971

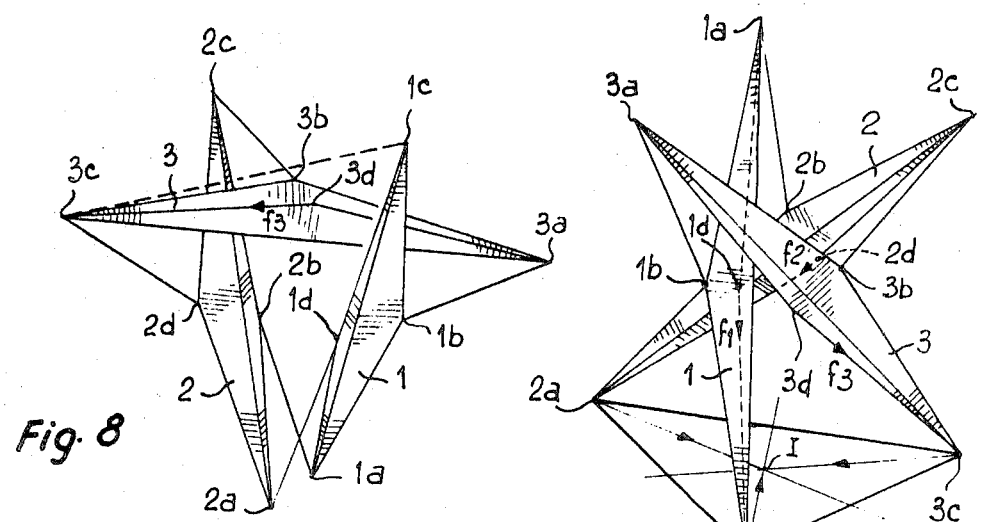
Fig. 8
Fig. 9
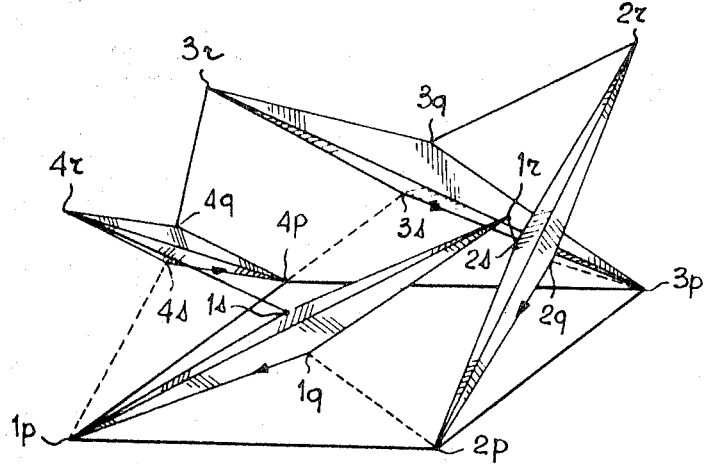
Fig. 10
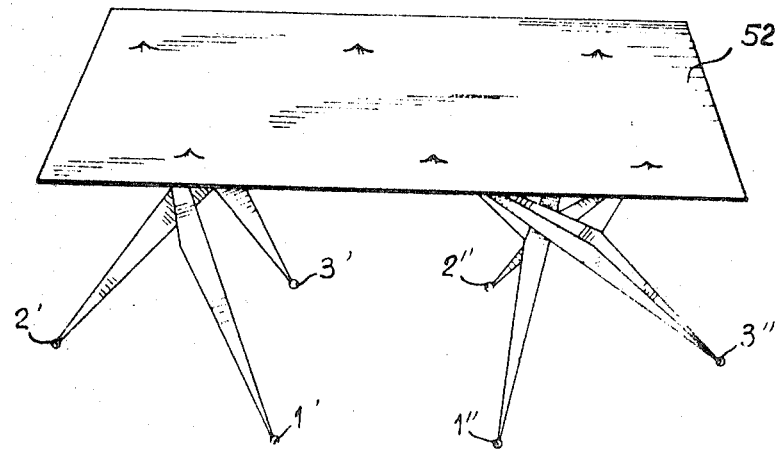
Fig. 11

3,614,847
ARCHITECTURAL STRUCTURE AND WORKS
UTILIZING THE SAID STRUCTURE
Pierre Debeaux, 2 Boulevard d'Arcole, Toulouse,
Haute-Garonne, France
Filed Dec. 17, 1968, Ser. No. 785,454
Claims priority, application France, Dec. 18, 1967,
132,671; Aug. 1, 1968, 161,543
Int. Cl. E04h 12/08
U.S. Cl. 52—648                                    1 Claim

ABSTRACT OF THE DISCLOSURE

An architectural structure which, in its simplest form, is a cell composed of at least three solid oblong elements connected to each other and positioned with respect to each other, without mutual contact, by the action of a system of tie-rods, the number of which does not exceed twice the number of solid elements considered, and which connect at least one intermediate point of each of said elements to a point close to one extremity of another solid element.

The above structure generally comprises four tie-rods per solid element. It is however possible to form a structure in which the solid elements are connected to each other.

An architectural structure in accordance with the structure specified above, in which the solid elements are connected to each other and positioned with respect to each other by the action of tie-rods, at least one of said solid elements being connected to an adjacent solid element by tie-rods of which at least one has issued from a substantially central or intermediate point of said solid element so as to terminate and be fixed to the other extremity of an adjacent solid element, the other solid elements being connected to each other by four tie-rods coupling a point close to one of the extremities of a solid element to an intermediate or substantially central point of another solid element.

Finally, these structures are applicable to constructional and building works and even to spatial relays.

---

The present invention relates to a new architectural structure, and also to the works or buildings which utilize the said structure.

Architects and builders have at all times sought for the most reliable means of complying with the fundamental necessity of strength in the buildings for which they are responsible. A thorough knowledge of the statics of bodies and the appearance of new materials have however caused a rapid evolution of the techniques employed; from the conventional supporting wall on which the beam rests have appeared the arches, the overhangs, and the spans of increasing length.

Certain more modern forms of construction which derive, not only from an aesthetic search but also from an extensive scientific study of the forces and the stresses imposed by the shapes and the weights of the elements of the construction, deliberately depart from architectural and technical classicism in order to present shapes, surfaces and volumes arranged in space following the most varied orientations but which nevertheless, through the intermediary of their points of support or of their interconnections, constitute perfectly stable and strong assemblies.

These works or these buildings which, in the eyes of the public, are frequently solely attributed to the daring of an architect, are in addition the result of an extremely thorough scientific study, during the course of which no force, no stress, no action and reaction, no dimension and no strength have been left to chance. It is at the cost of this study that works which sometimes have a slender appearance are endowed with extraordinary strength.

Following a constant tendency in architecture, it can often be observed that the character of the building is developed from the simple or varied repetition of a basic design which constitutes its proper theme. This is the case for example of the conventional orders.

At the present time, these repetitions are perhaps less apparent, since they may be located at a more technical level, forming for example the more or less concealed skeleton of the building. Finally, they are not always identical with each other; they take a multiplicity of forms although the basic governing idea remains the same.

The present invention is precisely concerned with an architectural structure or cell which, in addition to its aesthetic interest, offers a large number of technical advantages, especially in its physical qualities of strength, but also in the multiplicity of its practical applications, to which it brings remarkable properties, as well become apparent later.

In order to clarify the explanation, it must be stated that by the term "cell" is simply meant the smallest elementary structure according to the invention, it being understood that such cells may not only assume different forms, but they may be juxtaposed or combined so as to constitute a larger structure.

In its simplest form, the architectural structure in accordance with the invention is a cell composed of at least three solid oblong elements coupled to each other and positioned with respect to each other, without mutual contact, by the action of a system of tie-rods, the number of which does not exceed twice the number of the solid elements considered and which connect at least one intermediate point of each of these elements to an adjacent point of one extremely of another solid element.

In a frequent case, the solid elements are connected to each other and positioned with respect to each other by the action of four tie-rods per element.

For the sake of simplicity, there have been omitted from this definition the force of gravity and the reactions which this causes when the cell is supported or simply placed on the ground. In other words, this cell is isostatic per se, the action of gravity affecting perhaps its natural position of equilibrium, without however necessitating the adjunction of supplementary elements in order to preserve its isostatic character. It is of course possible to provide one or more additional tie-rods, thereby rendering the structure hyperstatic, i.e., containing "dispensable" tie-rods not needed to keep the structure from being deformed.

Each of the solid elements, which will be designated throughout the remainder of this text by the conventional term "beam," is isolated in space in the sense that it does not directly touch its corresponding neighbours. It is only connected to these latter by means of tie-rods, namely members which are only capable of withstanding tensile forces.

In addition, since each beam is in equilibrium in space, the forces to which it is subjected must have a zero resultant. Now, it follows from the definition of the cell according to the above-mentioned frequent case, that each beam, which will be assumed to be oblong in order to facilitate the argument, receives a tie-rod in the vicinity of each of its extremities and two tie-rods in its central portion. As these four tie-rods cannot be coplanar, the beams are therefore subjected to forces which act upon them by bending, in exactly the same way as a balance-beam or even a bow bent ready to shoot an arrow.

In the above frequent case, each beam possesses two intermediate fixing points for the tie-rods. In order to obtain a tie-rod of the cell in accordance with the invention, it is possible to slide one of these two fixing points towards one of the extremities of the beam so that in the limit, the said beam will be acted upon by a single intermediate tie-rod, one tie-rod at one of the extremities and two tie-rods at the other extremity.

Whenever a tie-rod is displaced in the manner described above, there is obtained a new isostatic cell. It is therefore possible, while remaining within the scope of the general definition, to obtain as many different cells as the number of displacements of tie-rods which can be envisaged, one of these particular limiting cases being that in which all the beams have been subjected to the displacement of one of their intermediate tie-rods.

The above-mentioned transformation can be effected for all types of cells in conformity with the general case and in particular irrespective of the number of beams included in an elementary cell.

The displacement of the tie-rods recommended necessarily involves the presence of two concurrent tie-rods at the same extremity of a single beam; in most cases, it will not be possible to replace the two concurrent tie-rods by one only, except in the case where the cell has a symmetry which lends itself to this displacement, or that in which another cell belonging to the same architectural structure or to a neighbouring structure would necessitate, for its own equilibrium, a force equal to that which would be exerted by the said single tie-rod replacing the two concurrent tie-rods.

A cell in equilibrium is naturally subjected, irrespective of its type, to internal compression, bending and torsion stresses. These latter can be calculated by the usual methods, taking into account the weight and the shape of the cell, together with the load to which it is subjected. The calculation permits of the subsequent establishment of the strength standards of the beams and therefore their structure and their dimensioning.

The cell according to the invention constitutes alone an achitectural structure capable of being used separately in a work. It is only necessary to fix it on a support, to position and arrange the beams in such manner as to adapt them to their function. Thus, a single cell may quite well be used to constitute a foot-bridge. To this end, one of the beams is placed horizontally so as to form the floor of the foot-bridge, the other beams constituting supporting members by means of tie-rods.

As has already been indicated, this cell is multiform, that is to say it can assume an infinite number of shapes, provided that the fundamental conditions of equilibrium are respected, these conditions being analyzed below and being implicit in the actual constitution of the cell.

On the other hand, the cell is capable of taking-up any position and any orientation in space. Thus, if it is desired to build a foot-bridge having a flooring which is particularly high with respect to the area to be crossed, it is possible, after having horizontally directed one of the beams, to deform a regular cell, of the type having four tie-rods per element, following one or more privileged axes—for example a vertical axis—by multiplying the level heights by a constant coefficient; the horizontal beam is thereby raised.

Amongst the cells which have been described as alternatives, namely those in which an intermediate tie-rod has been displaced, the particular case relating to the most simple cell (three beams) in which one tie-rod displacement per beam has been effected, is a case which can be conveniently employed, especially to serve as a footing for a superstructure. The three tie-rod displacements are then carried out in directions which are included in a half-space. The extremities of the elements placed on a support in the same way as a tripod are connected to each other after the displacement of the tie-rods. On this assumption, it is possible to replace two concurrent tie-rods by a single tie-rod directed along the resultant of the forces.

The three resultant tie-rods thus obtained are in turn concurrent in a point at which they can be connected to each other; the cell preserves its isostatic character in this way.

It will be clear that, without thereby departing from the scope of the present invention, the cell may be fitted-up and arranged according to the use for which it is intended. For example, the space left free between the beams can be filled in by panels or by arches which in no way modify the basic principles, namely the balancing and the stability of the cell.

In very many circumstances, the architectural structure will be formed by a plurality of cells connected to each other; these cells may furthermore be of different types. In particular, if the work to be constructed consists of a bridge which is to have an extremely long roadway, a number of cells, that is to say a number of foot-bridges such as those described above, may be placed together end-to-end.

When seeking increased stability and strength, the tie-rods may be multiplied, thus rendering the cell or structure hyperstatic. In this case also, the principle of the invention is respected. Instead of considering the various tie-rods as issuing from a single point, it is only necessary to refer to the resultant of the forces applied at this point to fined the position of the single tie-rod which complies with the most general definition given to the cell.

Finally, the cell in accordance with the invention may comprise more than three beams, each of which is always maintained in equilibrium by the action of four tie-rods.

In order to define other objects, characteristic features and advantages of the invention, an example of a cell and its utilization will now be described below, without any implied limitation, reference being made to the accompanying drawings, in which:

FIG. 8 shows an alternative form of an elementary cell with three beams, having a single tie-rod displacement;

FIG. 9 is an alternative form of an elementary cell with three beams, having three tie-rod displacements;

FIG. 10 illustrates an elementary cell with four beams and four tie-rod displacements;

FIG. 11 is a simplified diagram of a utilization of the cell with three beams shown in FIG. 9 as a footing member.

Figure 1:
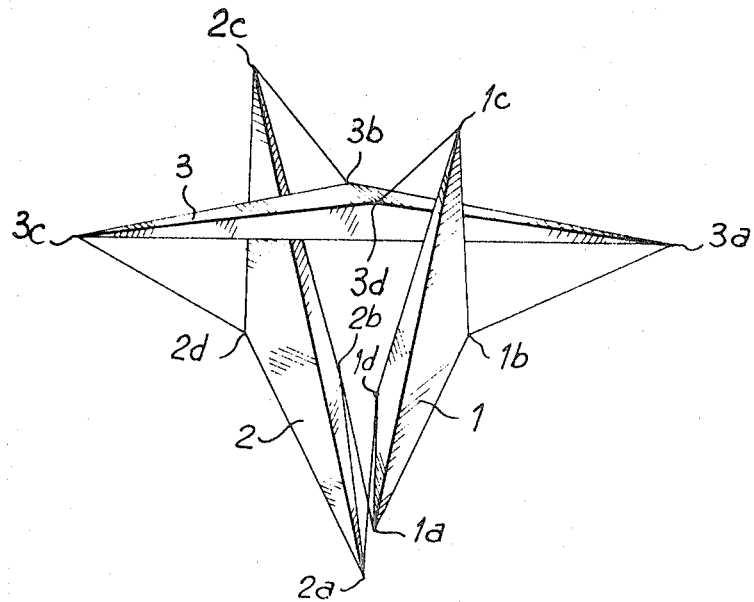
FIG. 1 represents an elementary cell of a first type.

In FIG. 1 which illustrates a prototype cell, the beams are shown at 1, 2 and 3. Each of these beams is connected to two other beams by means of four tie-rods:

The tie-rod $1a–2b$, which connects one extremity of the beam 1 to a substantially central point of the beam 2;

The tie-rod $1c–3d$, which connects the other extremity of the beam 1 to a substantially central point of the beam 3;

The tie-rod $1b–3a$, which connects the substantially central point of the beam 1 to one of the extremities of the beam 3;

The tie-rod $1b–2a$, which connects a substantially central point of the beam 1 to one of the extremities of the beam 2.

By the action of these four tie-rods, each of the beams is thus immobilized and in equilibrium in space, without coming into contact with the neighbouring beams.

A consideration of the beam 3 bring out with particular clearness that the tie-rods issuing from the central points urge the beam upwards, while the tie-rods issuing from the extremities on the contrary act downwards. This series of tensile forces compels the beam 3 to work particularly in bending, in a similar way to a bow which is bent.

Figure 2:
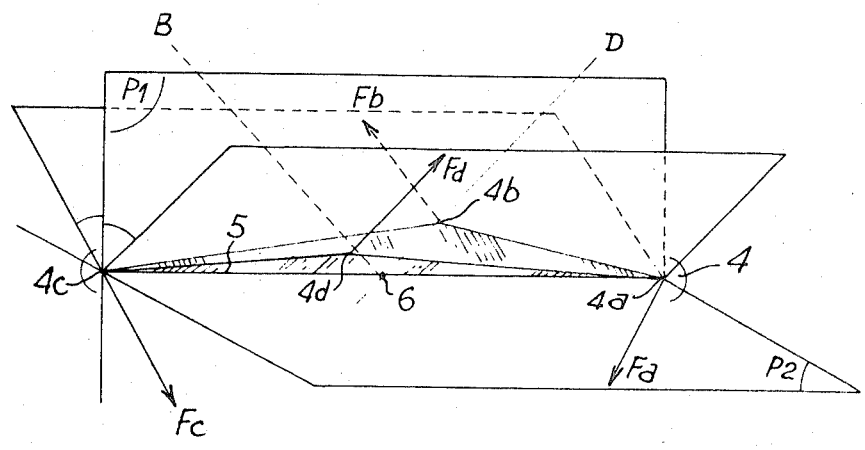
FIG. 2 is a diagram showing the arrangement of the traction forces to which each of the beams is subjected in a cell according to FIG. 1.

In order to enable an analysis to be made of the conditions of equilibrium of a beam, there has been shown in the diagram of FIG. 2 a beam 4 of substantially oblong shape. This beam is subjected to the tensile force of four tie-rods, this force having been represented in space in the form of four arrows $Fa$, $Fb$, $Fc$ and $Fd$ applied to the beam at $4a$, $4b$, $4c$ and $4d$; the points $4a$ and $4c$ are the extremities, while $4b$ and $4d$ are substantially central points. In order to bring out the fact that the four points $4a$, $4b$, $4c$ and $4d$ are not coplanar, they have been placed at the four corners of a left-hand quadrilateral.

On the straight line 5 which joins the points $4a$ and $4c$, there are drawn, from the centre 6 of this straight line, two axes D and B parallel respectively to the forces $Fd$ and $Fb$.

The planes, one of which contains the straight lines 5 and D while the other contains the straight lines 5 and B form a dihedral angle giving two bisecting planes $P_1$ and $P_2$. As the beam is in equilibrium, the resultant of the forces to which it is subjected must be zero. In particular, the projection of this resultant (that is to say the resultant of the projections) on the planes $P_1$ and $P_2$ must also be zero. This is what is shown in FIGS. 3 and 4, the first of which gives the projection of the forces in the plane $P_1$, while the second gives their projection in the plane $P_2$.

Figure 3:
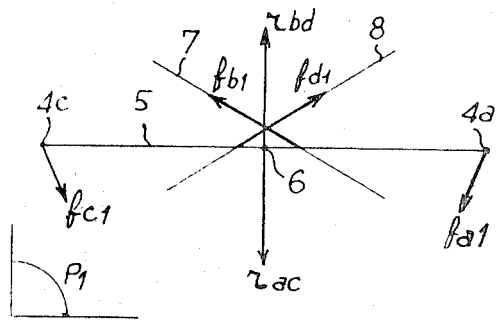
FIGS. 3 and 4 show the projection of these forces in privileged planes.

In FIG. 3 is shown the straight line 5 which connects together the extremities $4a$ and $4c$ of the beam. The orthogonal projection of $Fa$ on the plane $P_1$ is indicated at $fa_1$ and that of $Fc$ at $fc_1$; the resultant of these two latter projections is $r_{ac}$.

If there is now considered the orthogonal projection of the two tensile forces applied to the points substantially central of the beam, this is projected orthogonally in the plane $P_1$ on axes 7 and 8. By causing the projections of these two forces $Fb$ and $Fd$ to slide in such manner that the said projection has its point of application on the straight line 5, it is possible to represent the projection of these two forces by $fb_1$ and $fd_1$. The resultant of these two latter projections is $r_{bd}$. Neglecting the forces of gravity and the loads to which the cell would be subjected, the equilibrium of the beam thus necessitates that the resultants $r_{ac}$ and $r_{bd}$ are equal in absolute value and of opposite sign.

Figure 4:
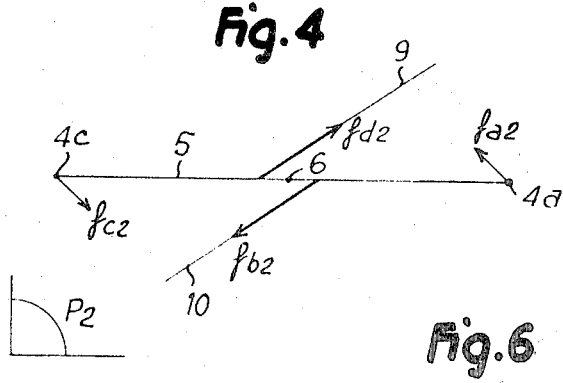

If there is now considered the projection of these forces on the plane $P_2$, FIG. 4 illustrates at $fa_2$ and $fc_2$ the orthogonal projection on this plane of the forces $Fa$ and $Fc$. Similarly, the projection of the forces $Fb$ and $Fd$ is carried out along two axes 9 and 10, on which axes the projections can be caused to slide so as to bring them to have their point of application on the straight line 5, which gives $fb_2$ and $fd_2$. It is then found that the projections $fa_2$ and $fc_2$ on the one hand, and $fb_2$ and $fd_2$ on the other hand act in opposition in pairs and give a zero resultant. Furthermore, the sum of the moments of the various forces with respect to any particular point—for example the central point 6—must be zero. It follows in the case of the present figures that, for example, the moment of $fa_2$ with respect to the point 6 must be opposite to the moment of $fb_2$ with respect to this same point 6.

It has of course been assumed in FIGS. 2, 3 and 4 that the tensile forces applied to the extremities of the beams and the forces applied to the substantially central points were equal in pairs, which corresponds to the case of the uniform isolated cell. In all cases, the constitution of the cell is such that the latter always responds, if necessary by displacements in space, to any symmetrical or asymmetrical force.

Figure 5:
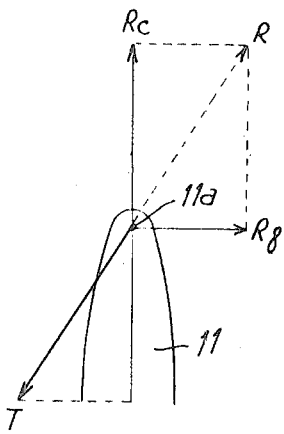
FIG. 5 represents the conditions of equilibrium of the extremity of a beam in accordance with FIG. 1.

FIG. 5 also permits consideration of the equilibrium of the extremity of one of these beams. It shows the extremity $11a$ of a beam 11, on which the tie-rod applies a tension force T which must be balanced by the reaction force R applied by the said beam on the tie-rod. This reaction R can be analyzed and split-up into two forces: $Rc$ and $Rf$, which correspond respectively to the reaction caused by the compression to which the beam is subjected and the reaction to bending which is applied to the extremity of this beam.

Figure 6:
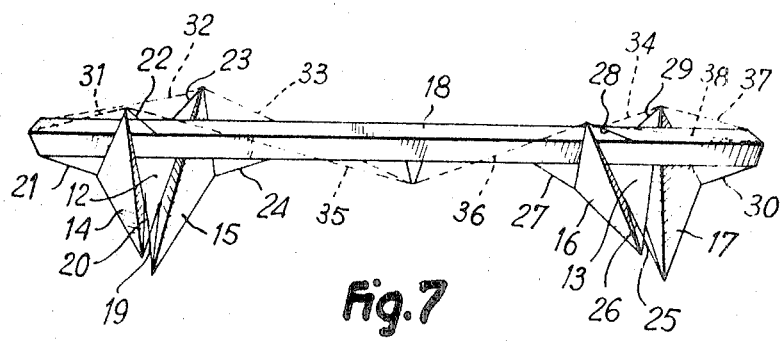
FIG. 6 is a diagram of a suspension bridge constructed by means of two cells placed end-to-end.

FIG. 6 represents a suspension bridge constructed by means of two cells 12 and 13 in accordance with the invention, the cells being placed end-to-end. Two of the beams of each of them constitute the piles of the bridge; these are the elements 14, 15, 16 and 17. The roadway 18 of the bridge is formed by the third beams of the two cells, arranged end-to-end.

In accordance with the invention, each cell comprises the six basic tie-rods:

The tie-rods 19, 20, 21, 22, 23 and 24 for the first cell;
The tie-rods 25, 26, 27, 28, 29 and 30 for the second cell.

For reasons of a practical nature and of safety, the piles of the bridge in the example are connected to the roadway by additional tie-rods which render the system hyperstatic. Additional tie-rods, shown at 31, 32, 33, 34, 35, 36, 37 and 38 also make it possible to increase the span between the piles of the bridge as a function of the point of fixing of these tie-rods, of the nature and of the actual structure of the roadway.

Suspension bridges designed in this manner offer considerable advantages as compared with the usual types of suspension bridge.

In particular, it is observed that the stability and the strength of the assembly do not depend on additional mechanical couplings between this bridge and its surroundings.

In fact, conventional suspension bridges have an inert roadway suspended from cables, the tension of which is ensured by anchoring their extremities in the ground. On the contrary, in accordance with the invention, the roadway is a beam of any kind which is subjected to various forces in the same way as the other beams—that is to say the piles of the bridge—and which does not necessarily require anchorages in the ground for its support.

FIG. 6 of course shows two juxtaposed cells, but it is simple to imagine an extension of the bridge by juxtaposing still more cells in the same line of extension. The independence of the cells relatively to their stability makes it even a very simple matter to construct a suspension bridge which is not in a straight line, which it is not possible to obtain when using the prior systems.

Figure 7:
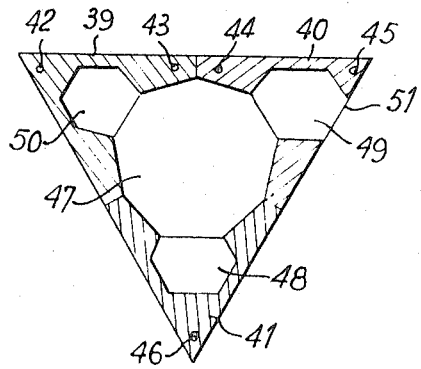
FIG. 7 is a view in cross-section of an example of flooring which can be employed within the scope of the invention.

In addition, the invention permits the use of roadways of a new design. This roadway will in fact inevitably work in compression, in bending and in torsion; it is therefore essential that it should itself be designed so as to resist such forces. Now, it is known that a hollow beam withstands such forces very well, so that it may be advisable to take advantage of this in order to establish traffic ways actually inside the roadway. This design is show in FIG. 7, which indicates a possible section of the said roadway 18.

Assuming this section to be of the form of an equilateral triangle, the roadway is formed by three identical units 39, 40 and 41, the transverse section of which permits, by bringing them together, of constituting the general section of the roadway. These units have a certain length and may be rigidly fixed to each other by methods such as those which consist of mutually fixing these elements together by two layers of stretched spirals wound in opposite directions. In addition to the coupling effect, these methods permit the pre-stressing of the whole of the said roadway. It will be understood that other reinforcements such as 42, 43, 44, 45 and 46, may differentiate the pre-stress in a single section, depending on the zone of the roadway in which this section will be arranged.

The juxtaposition of the units and their internal cutaway portions result in the formation of tunnels such as 47, 48, 49 and 50. These tunnels may each comprise either a vehicle traffic road or a railway track, or ventilation conduits or piping systems and conduits of the most varied nature. Certain units such as 40 may be provided with lateral ventilation windows 51.

In FIG. 8 is illustrated an alternative form of an elementary cell according to the invention, having three beams. The references employed have been deliberately made the same as those which were used for FIG. 1, in order to show more clearly how the alternative construction is deduced from the general case.

The only modification consists of the displacement of the tie-rod which initially connected the point 1c to 3d and which in this case connects 1c to 3c; in other words, the fixing point 3d has been given a movement of translation in the direction of the arrow f3 to 3c.

In FIG. 9, the same cell as that shown in FIG. 8 has been placed on the extremities 1c, 2c and 3c. The tie-rods 1a–2b, 2c–3d, 3c–1b have remained in their original positions. On the other hand, the extremity 1d of the tie-rod 2a–1d has been transferred towards 1c in the direction of the arrow f1. The tie-rod 3c–2d has had its extremity 2d transferred towards 2a in the direction of the arrow f2 and the tie-rod 1c–3c has remained in position as in FIG. 8.

The cell is therefore in equilibrium by virtue of the three unchanged tie-rods above-mentioned and of the three displaced tie-rods which connect the extremities 1c, 2a and 3c.

As has already been stated, these last three tie-rods can be replaced without disadvantage by three other tie-rods directed along the resultants of the forces applied by the connections 1c, 2a, 3c, taken in pairs. These three new tie-rods are concurrent at a point "1" at which they are connected to each other.

In the practical case in which the points 1c, 2a, 3c rest on a support, it is not essential for the tie-rods issuing from these points to be physically provided. In such a situation, they may be replaced by an appropriate means for retaining such point or points on the respective supports, provided such means is capable of withstanding the forces applied. For example, such means could comprise abutments, bearings, joints, or other means well known in the building art.

In FIG. 10 there is illustrated a cell with four beams. In accordance with the general definition of the cell, one of the extremities of each beam is connected to a substantially central or intermediate point of an adjacent beam. In this way it is possible to distinguish the tie-rods 1r–2s, 2r–3q, 3r–4q, 4r–1s shown in full lines, and also the tie-rods 2q–3p, 3s–4p, 4s–1p, 1q–2p shown in broken lines.

According to the alternative form, some of these tie-rods are subjected to a displacement such that one of their fixing points is caused to slide towards one extremity of the beam.

In FIG. 10, it has been chosen arbitrarily to displace the four tie-rods shown in broken lines, so as to obtain after displacement, four new tie-rods coupling together the extremities 1p to 2p, 2p to 3p, 3p to 4p, 4p to 1p.

Thus, the four tie-rods located in the same half-space have been displaced in the manner previously described and illustrated in FIG. 9.

It would however have been possible to displace a smaller number of tie-rods or again, in this case, to displace up to four tie-rods correctly chosen, in both the two opposite half-spaces.

It is clear that such cell transformations may be carried out generally, irrespective of the number of beams included in the cell.

In practice, for each transfer of tie-rods, there is obtained a new isostatic cell according to the present alternative form, and the higher the number of beams the greater the number of isostatic cells which can be produced.

It should be observed that, for beams which are considered as indeformable, the proposed displacement of the fixing point of the tie-rod results, on the one hand in a variation in length of the tie-rod displaced and on the other hand in a change of the relative positions of the beams, the cell remaining normally isostatic.

The variation, change and movement which result are themselves utilizable if so required, and are included in the scope of the invention.

In the limit, or beyond this point, such a displacement of a fixing point can make it possible to leave the conditions of equilibrium and to render the cell deformable or bendable, for the purpose, for example, of reducing its bulk for its storage or conveyance.

In FIG. 11, there has been shown an example of the use of a cell with three beams serving as a support for a roof. Two cells rest on their extremities 1', 2', 3' and 1", 2", 3". The latter are then preferably fixed to the ground by abutments or other means, the other extremities receiving the roof 52. The structure of this roof must be such that it is capable of being supported by the extremities of each of the beams.

The present invention is not restricted to the examples described above but comprises on the contrary all the alternative forms within the scope of those skilled in the art. In particular, the cell may be adapted to any kind of artistic work or to any kind of construction. It is especially possible to refer to an important space application. It is the intention of those responsible for astronautics to establish satellite platforms serving as relays for example. By means of the present invention, it is a very simple matter to manufacture the frame of such a platform from three (or more) solid elements, for example rockets, on which ropes can be very simply secured so as to constitute the tie-rods of a cell, the beams of which are the solid elements themselves.

This satellite cell can be utilized either as it is or equipped, or even connected to other cells so as to constitute the spatial relay.

What I claim is:

1. An architectural structure which, in its simplest form, is a balanced cell composed of three solid oblong elements adapted to operate under flexion and compression, each of the said solid elements being positioned with respect to the others, without mutual contact, by means of four tie-rods, two of the said tie-rods being attached to the extremities of the said solid element and terminating at predetermined intermediate points of two adjacent solid elements, the other two of said tie-rods being attached to predetermined intermediate points of the said solid element and respectively terminating at an extremity of each of two adjacent solid elements.

References Cited

UNITED STATES PATENTS

| 3,063,521 | 11/1962 | Fuller | 52—81 |
| 3,169,611 | 2/1965 | Snelson | 52—648 |
| 3,354,591 | 11/1967 | Fuller | 52—81 |

FOREIGN PATENTS

| 1,377,290 | 1964 | France | 52—81 |
| 1,377,291 | 1964 | France | 52—648 |
| 1,519,240 | 1964 | France | 52—81 |

FRANK L. ABBOTT, Primary Examiner

H. C. SUTHERLAND, Assistant Examiner

U.S. Cl. X.R.

248—431; 108—150